(12) United States Patent
Kumagai et al.

(10) Patent No.: US 7,884,923 B2
(45) Date of Patent: Feb. 8, 2011

(54) LASER SURVEYING SYSTEM AND DISTANCE MEASURING METHOD

(75) Inventors: Kaoru Kumagai, Itabashi-ku (JP); Kenichiro Yoshino, Itabashi-ku (JP); Yasushi Tanaka, Itabashi-ku (JP); Ikuo Ishinabe, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/315,357

(22) Filed: Dec. 2, 2008

(65) Prior Publication Data

US 2010/0091263 A1 Apr. 15, 2010

(30) Foreign Application Priority Data

Oct. 9, 2008 (JP) .............................. 2008-262412

(51) Int. Cl.
*G01C 3/08* (2006.01)
(52) U.S. Cl. ..................................... 356/4.01; 356/5.01
(58) Field of Classification Search ....... 356/4.01–5.01; 382/106
See application file for complete search history.

(56) References Cited

U.S. PATENT DOCUMENTS 5,923,468 A * 7/1999 Tsuda et al. ................. 359/426
6,801,305 B2 * 10/2004 Stierle et al. ................ 356/4.01
2008/0075325 A1 * 3/2008 Otani et al. .................. 382/106

FOREIGN PATENT DOCUMENTS

JP 2008-076303 4/2008

* cited by examiner

*Primary Examiner*—Isam Alsomiri
(74) *Attorney, Agent, or Firm*—Nields, Lemack & Frame, LLC (57) ABSTRACT

A laser surveying system, comprising a light source for emitting a laser beam, a projection optical system for turning the laser beam from the light source to a parallel luminous flux, a scanning unit for projecting the luminous flux of the projected laser beam for scanning, a scanning direction detecting unit for detecting a scanning direction, a photodetection optical system for receiving a reflected light of the projected laser beam from an object to be measured, a photodetection element for performing photo-electric conversion of the reflected light received via the photodetection optical system, and a distance measuring unit for measuring a distance based on a signal from the photodetection element, wherein the projection optical system has a luminous flux diameter changing means, and a luminous flux diameter of the projected laser beam is enabled to be changed.

10 Claims, 5 Drawing Sheets

LASER SURVEYING SYSTEM AND DISTANCE MEASURING METHOD

BACKGROUND OF THE INVENTION

The present invention relates to a laser surveying system and a distance measuring method for projecting a laser beam to an object to be measured and for measuring a distance by receiving a light reflected from the object to be measured.

As an electro-optical distance measuring system, a laser surveying system is known, which projects a laser beam as a distance measuring light to an object to be measured and measures a distance to the object to be measured by using a light reflected from the object to be measured.

When a laser beam is projected to an object to be measured and electro-optical distance measurement is performed, a point on the object to be measured where the laser beam is projected is not necessarily on a flat surface, and the point may be an edge where flat surfaces cross each other. Because the laser beam has a certain spreading, a luminous flux of the beam has an area, and the condition on the projected surface of the object to be measured exerts influence on the results of measurement.

For this reason, for the purpose of improving the distance measurement accuracy in the electro-optical distance measurement, it is desirable that a beam diameter (spot size) of the laser beam is as small as possible.

As the laser beam used for a distance measurement light, it is preferable that near-infrared light with a wavelength of 1.4 µm to 2.6 µm is used. The near-infrared light is an invisible light. Even when the laser beam is projected into a human eye, no uncomfortableness is caused and the near-infrared light hardly injures the eye. On the other hand, the near-infrared light has a long wavelength and is easily influenced by interference. As a result, the spreading angle is increased. The spot size of the laser beam projected to the object to be measured is increased, and this leads to the decrease in the measurement accuracy.

In the past, the beam diameter is set to match the measuring ability of the laser surveying system, and to have an adequate value to match a standard distance to be measured, e.g. an average distance to be measured, and average measurement accuracy is improved.

In this respect, in the conventional type laser surveying system, there has been a tendency that error is increased when the actual distance to be measured is deviated from the standard measurement distance. In particular, in case near-infrared light is used as the distance measuring light, the spreading angle is big, and there has been a tendency that bigger error is caused when the distance to be measured is deviated from the standard measurement distance.

SUMMARY OF THE INVENTION

It is an object of the invention to provide a laser surveying system and a distance measuring method, by which it is possible to change a beam diameter to match the distance to be measured and to improve measurement accuracy regardless of the length of the distance to be measured.

To attain the above object, the present invention provides a laser surveying system, which comprises a light source for emitting a laser beam, a projection optical system for turning the laser beam from the light source to a parallel luminous flux, a scanning unit for projecting the luminous flux of the projected laser beam for scanning, a scanning direction detecting unit for detecting a scanning direction, a photodetection optical system for receiving a reflected light of the projected laser beam from an object to be measured, a photodetection element for performing photo-electric conversion of the reflected light received via the photodetection optical system, and a distance measuring unit for measuring a distance based on a signal from the photodetection element, wherein the projection optical system has a luminous flux diameter changing means, and a luminous flux diameter of the projected laser beam is enabled to be changed. Also, the present invention provides the laser surveying system as described above, wherein the luminous flux diameter changing means changes an aperture diameter of the projection optical system. Further, the present invention provides the laser surveying system as described above, wherein the luminous flux diameter changing means changes a focal distance of the projection optical system. Also, the present invention provides the laser surveying system as described above, which further comprises a control unit for driving and controlling the luminous flux diameter changing means, wherein the control unit controls the luminous flux diameter changing means so as to have a luminous flux diameter suitable for a distance to the object to be measured. Further, the present invention provides the laser surveying system as described above, which further comprises a control unit for driving and controlling the luminous flux diameter changing means, wherein the control unit controls the luminous flux diameter changing means according to an approximate distance obtained through a preliminary measurement on a distance to the object to be measured by the laser beam with an arbitrary luminous flux diameter.

Also, the present invention provides a distance measuring method, which comprises a step of setting a beam diameter of a laser beam projected to match an approximate distance to an object to be measured, a step of projecting the laser beam to the object to be measured, a step of receiving a reflected light of the projected laser beam from the object to be measured, and a step of measuring a distance to the object to be measured based on the received reflection light. Further, the present invention provides the distance measuring method as described above, which further comprises a step of performing a preliminary measurement of the approximate distance to the object to be measured by projecting the laser beam for scanning, wherein the beam diameter is set according to the approximate distance obtained. Also, the present invention provides the distance measuring method as described above, which further comprises a step of collimating the object to be measured and focusing by a focusing mechanism, and a step of performing a preliminary measurement to measure the approximate distance to the object to be measured based on a focusing position of the focusing mechanism, wherein the beam diameter is set according to the approximate distance obtained.

According to the present invention, a laser surveying system comprises a light source for emitting a laser beam, a projection optical system for turning the laser beam from the light source to a parallel luminous flux, a scanning unit for projecting the luminous flux of the projected laser beam for scanning, a scanning direction detecting unit for detecting a scanning direction, a photodetection optical system for receiving a reflected light of the projected laser beam from an object to be measured, a photodetection element for performing photo-electric conversion of the reflected light received via the photodetection optical system, and a distance measuring unit for measuring a distance based on a signal from the photodetection element, wherein the projection optical system has a luminous flux diameter changing means, and a luminous flux diameter of the projected laser beam is enabled to be changed. Also, according to the present invention, there are provided a step of setting a beam diameter of a laser beam projected to match an approximate distance to an object to be measured, a step of projecting the laser beam to the object to be measured, a step of receiving a reflected light of the projected laser beam from the object to be measured, and a step of measuring a distance to the object to be measured based on the received reflection light. As a result, it is possible to have a beam diameter, which matches well the distance to be measured, and this contributes to the improvement of measurement accuracy.

DETAILED DESCRIPTION OF THE PREFERRED EMBODIMENT

Description will be given below on the best mode for carrying out the invention by referring to the attached drawings.

As a type of a laser surveying system, a 3-demensional measuring system is known, which is so-called a laser scanner. According to the 3-dimensional measuring system, a pulsed measuring beam is projected for scanning to an object to be measured and a distance is measured based on a reflection light from the object to be measured. Then, three-dimensional measurement of the object to be measured is performed based on the value of the measured distance and the value of projection angle, and point group data is obtained.

Figure 1:
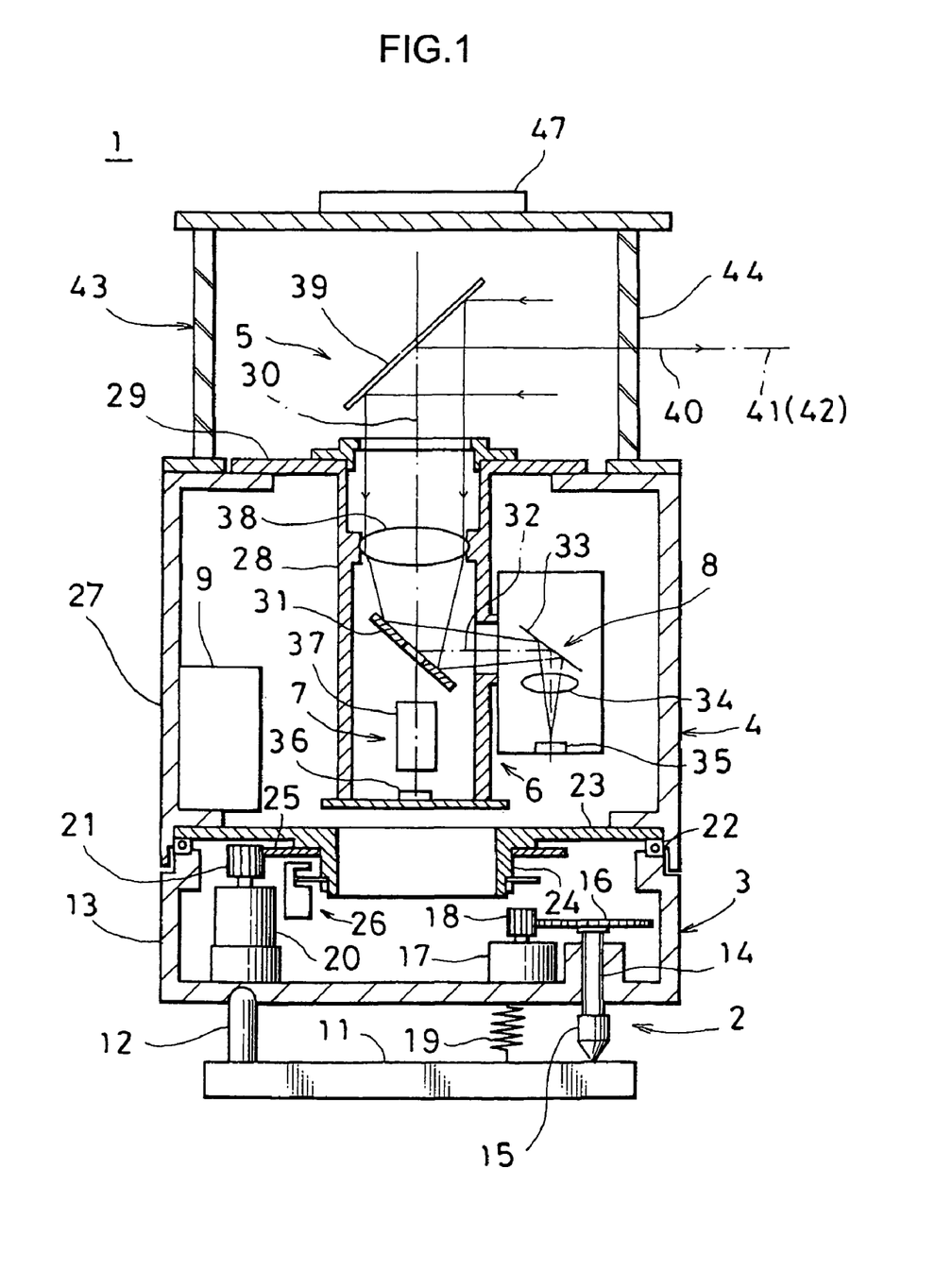
FIG. 1 is a cross-sectional view to show a laser surveying system according to an embodiment of the present invention.
Figure 2:
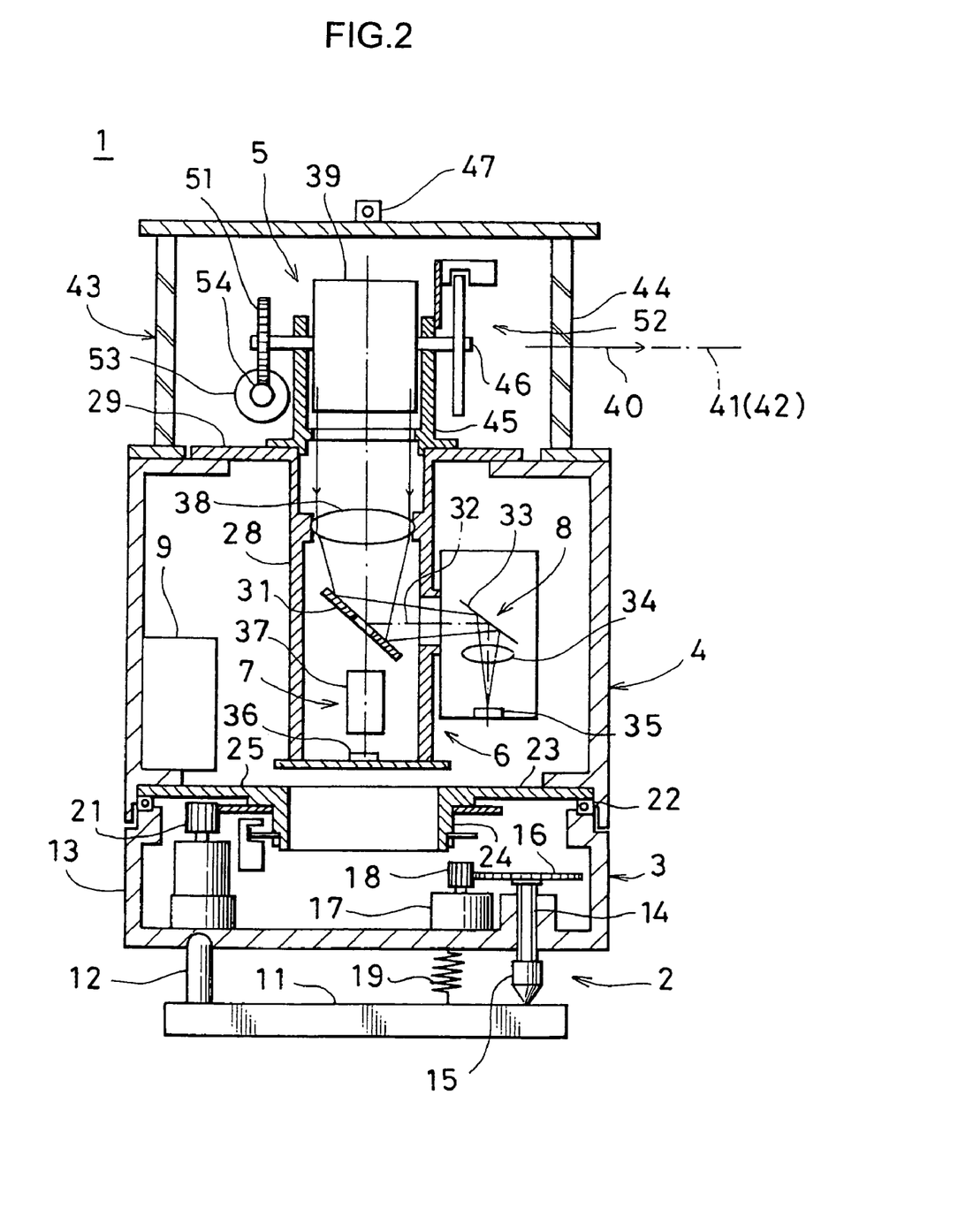
FIG. 2 is a cross-sectional view of the laser surveying system when a part thereof is rotated.

FIG. 1 and FIG. 2 each represents a case where the present invention is carried out on a laser scanner 1.

The laser scanner 1 primarily comprises a leveling unit 2, a rotary mechanism 3 installed on the leveling unit 2, a measuring system main unit 4 rotatably supported on the rotary mechanism 3, and a scanner unit 5 mounted on the top of the measuring system main unit 4. In the measuring system main unit 4, a distance measuring unit 6, a projection optical system 7, a photodetection optical system 8, a control unit 9, etc. are accommodated. For convenience purpose, FIG. 2 shows the condition where only the scanning unit 5 is seen from a lateral direction with respect to FIG. 1.

Now, description will be given on the leveling unit 2.

A pin 12 is erected on a base unit 11. The upper end of the pin 12 is formed with a curved surface and is tiltably engaged in a concave portion on the bottom surface of a lower casing 13. At other two points on the bottom surface, adjusting screws 14 are screwed in and are penetrating through. On the lower end of each of the adjusting screws 14, a leg member 15 is fixed. The lower end of the leg member 15 is formed with a tapered end or with a curved surface and is abutted to the base unit 11. On the upper end of the adjusting screw 14, a leveling driven gear 16 is attached. The lower casing 13 is supported on the base unit 11 at three points by the pin 12 and by the two adjusting screws 14 so that the lower casing 13 can be tilted around the tip of the pin 12. In order that the base unit 11 and the lower casing 13 are not separated from each other, a spring 19 is provided between the base unit 11 and the lower casing 13.

Two leveling motors 17 are mounted inside the lower casing 13 and a leveling driving gear 18 is attached on output shaft of the leveling motor 17, and the leveling driving gear 18 is engaged with the leveling driven gear 16. The leveling motor 17 is independently driven by the control unit 9. By the driving of the leveling motor 17, the adjusting screw 14 is rotated via the leveling driving gear 18 and the leveling driven gear 16 so that the amount of projection of the adjusting screw 14 in a downward direction can be adjusted. A tilt sensor 56 (see FIG. 3) is provided inside the lower casing 13. When the two leveling motors 17 are driven according to a detection signal of the tilt sensor 56, leveling of the leveling unit 2 is performed.

Next, description will be given below on the rotary mechanism 3.

The lower casing 13 also serves as a casing for the rotary mechanism 3. A horizontally rotating motor 20 is mounted in the lower casing 13, and a horizontal rotary driving gear 21 is mounted on an output shaft of the horizontal rotating motor 20.

On the upper end of the lower casing 13, a rotary base 23 is mounted via bearings 22. At the center of the rotary base 23, a rotation axis 24 projecting downward is provided. On the rotation axis 24, a horizontal rotary gear 25 is mounted, and the horizontal rotary driving gear 21 is engaged with the horizontal rotary gear 25.

A horizontal angle detector 26, e.g. an encoder, is mounted on the rotation axis 24. A relative rotation angle of the rotation axis 24 with respect to the lower casing 13 is detected by the horizontal angle detector 26. The result of the detection (horizontal angle) is inputted to the control unit 9. Based on the detection result, driving of the horizontal rotating motor 20 is controlled by the control unit 9.

Now, description will be given on the measuring system main unit 4.

A main unit casing 27 is fixed on the rotary base 23, and a body tube 28 is mounted inside the main unit casing 27. The body tube 28 has a center line, which is coaxial with the rotation center of the main unit casing 27, and the body tube 28 is mounted by means as necessary on the main unit casing 27. For instance, on the upper end of the body tube 28, a flange 29 is formed, and the flange 29 is fixed on a ceiling of the main unit casing 27.

The body tube 28 has an optical axis 30, which concurs with an axis of the body tube 28, and an aperture mirror 31, serving as an optical separating means, is provided on the optical axis 30. By the aperture mirror 31, a reflection light optical axis 32 is separated from the optical axis 30.

On the reflection light optical axis 32, there are provided a reflection mirror 33, a condenser lens 34, and a photodetection element 35 such as a photodiode, etc. On the optical axis 30, there are provided a light emitting element 36, which is a light emitting source, a luminous flux diameter changing means 37, an objective lens 38, and an elevation rotary mirror 39 are arranged.

The objective lens 38, the luminous flux diameter changing means 37, etc. make up together the projection optical system 7. The objective lens 38, the aperture mirror 31, the reflection mirror 33, the condenser lens 34, etc. make up together the photodetection optical system 8.

From the light emitting element 36, a pulsed beam is emitted. The light emitting element 36 is a semiconductor laser or the like, for instance. A pulsed laser beam of near-infrared light is emitted as a distance measuring light 40, and the light emitting element 36 is controlled by the control unit 9 so that the pulsed laser beam is emitted under the condition as required, e.g. with light intensity as required and at a pulse interval as necessary. The pulsed laser beam passes through the aperture mirror 31 and is reflected by the elevation rotary mirror 39, and is projected to the object to be measured.

The elevation rotary mirror 39 is a deflecting optical member and deflects the optical axis 30, which runs in a vertical direction, to a projection optical axis 41 in a horizontal direction.

To the photodetection element 35, a distance measuring light reflected from the object to be measured is entered via the elevation rotary mirror 39 and the photodetection optical system 8, and the reflected distance measuring light is detected by the photodetection element 35. It is so designed that a part of luminous fluxes separated from the distance measuring light 40 enters the photodetection element 35 as an internal reference light (not shown), and a distance to the object to be measured is measured based on the reflected distance measuring light and the internal reference light.

The reflection light optical axis 32, the reflection mirror 33, the condenser lens 34, the photodetection element 35, etc. make up together the distance measuring unit 6.

The reflection mirror 33 may be designed as a dichroic mirror, which allows visible light to pass and reflects infrared light so that the transmitted visible light is received by an image receiving unit (not shown) and the image is acquired. The image receiving unit is an aggregate of a multiple of pixels, which may be a CCD for instance, and an angle of a light beam entering the image receiving unit is determined by the position of the pixel in the image receiving unit, and the position of pixel is represented as a field angle (angle of view).

The elevation rotary mirror 39, the condenser lens 34, the image receiving unit, etc. make up together an image pickup unit 10. An image pickup light from the object to be measured is entered to the elevation rotary mirror 39 along an image pickup optical axis 42, which agrees with the projection light optical axis 41. After the image pickup light is reflected by the elevation rotary mirror 39, the image pickup light passes through the objective lens 38 and the aperture mirror 31 and is received by the image receiving unit (not shown), and an image is acquired. The distance measuring light optical axis for measuring a distance is coaxial with the image pickup light optical axis, which acquires the image in the direction to the object to be measured.

Next, description will be given on the scanning unit 5.

An upper casing 43 is provided above the main unit casing 27. A side wall of the upper casing 43, or preferably the total circumference of the side wall and the ceiling of the upper casing 43, is designed as a light projection window 44. The scanning unit 5 is accommodated inside the upper casing 43. Description will be given below on the scanning unit 5.

A mirror holder 45 is mounted on the upper end of the flange 29. On the mirror holder 45, the elevation rotary mirror 39 is rotatably mounted via a rotation shaft 46. An elevation rotary gear 51 is mounted on one of shaft ends of the elevation rotary mirror 39, and an elevation angle detector 52 is mounted on the other of the shaft ends of the elevation rotary mirror 39. The elevation angle detector 52 detects the rotation angle (rotating position) of the elevation rotary mirror 39, and the result of detection is sent to the control unit 9.

An elevation rotating motor 53 is mounted on the mirror holder 45, and an elevation rotary driving gear 54 is attached on an output shaft of the elevation rotating motor 53, and the elevation rotary driving gear 54 is engaged with the elevation rotary gear 51. The driving of the elevation rotating motor 53 is controlled by the control unit 9 based on the result of detection by the elevation angle detector 52. The control unit 9 can control the driving operation of the horizontal rotating motor 20 and the elevation rotating motor 53 so that the horizontal rotating motor 20 and the elevation rotating motor 53 are driven independently or synchronizingly.

A sight 47 is provided on the upper surface of the upper casing 43. The collimating direction of the sight 47 runs perpendicularly to the optical axis 30, and the collimating direction of the sight 47 also runs perpendicularly to the rotation shaft 46.

The projection optical system 7 projects the distance measuring light 40 emitted from the light emitting element 36 by turning the diameter of the light to a beam diameter as required, and the projection optical system 7 is provided with the luminous flux diameter changing means 37.

Figure 4:
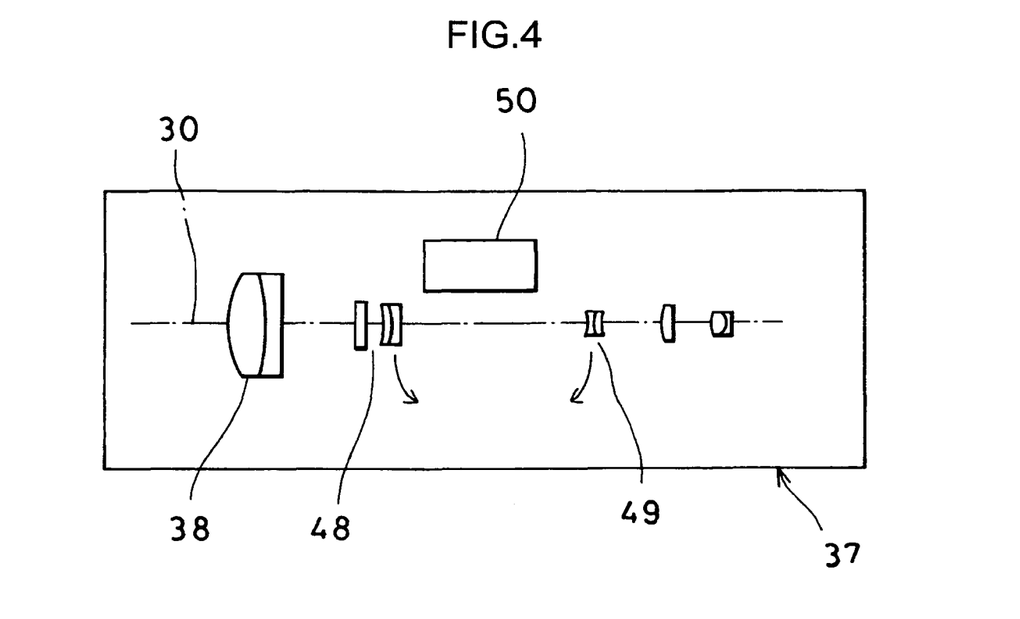
FIG. 4 is a schematical drawing to show an example of a luminous flux diameter changing means in the present invention.

FIG. 4 shows the projection optical system 7 provided with the luminous flux diameter changing means 37.

The luminous flux diameter changing means 37 has, for instance, a zooming function to change a focal distance of the projection optical system 7. The luminous flux diameter changing means 37 comprises lenses 48 and 49, which can move along the optical axis 30. The lenses 48 and 49 are adjusted so that the lenses 48 and 49 come closer to or away from each other by a zooming mechanism 50. By moving closer to or away from the lenses 48 and 49, the focal distance of the projection optical system 7 can be changed.

The distance measuring light 40 projected from the scanning unit 5 has a portion where the beam diameter reaches the minimum (beam waist). The position of the beam waist is changed depending on the focal distance of the projection optical system 7.

Figure 6:
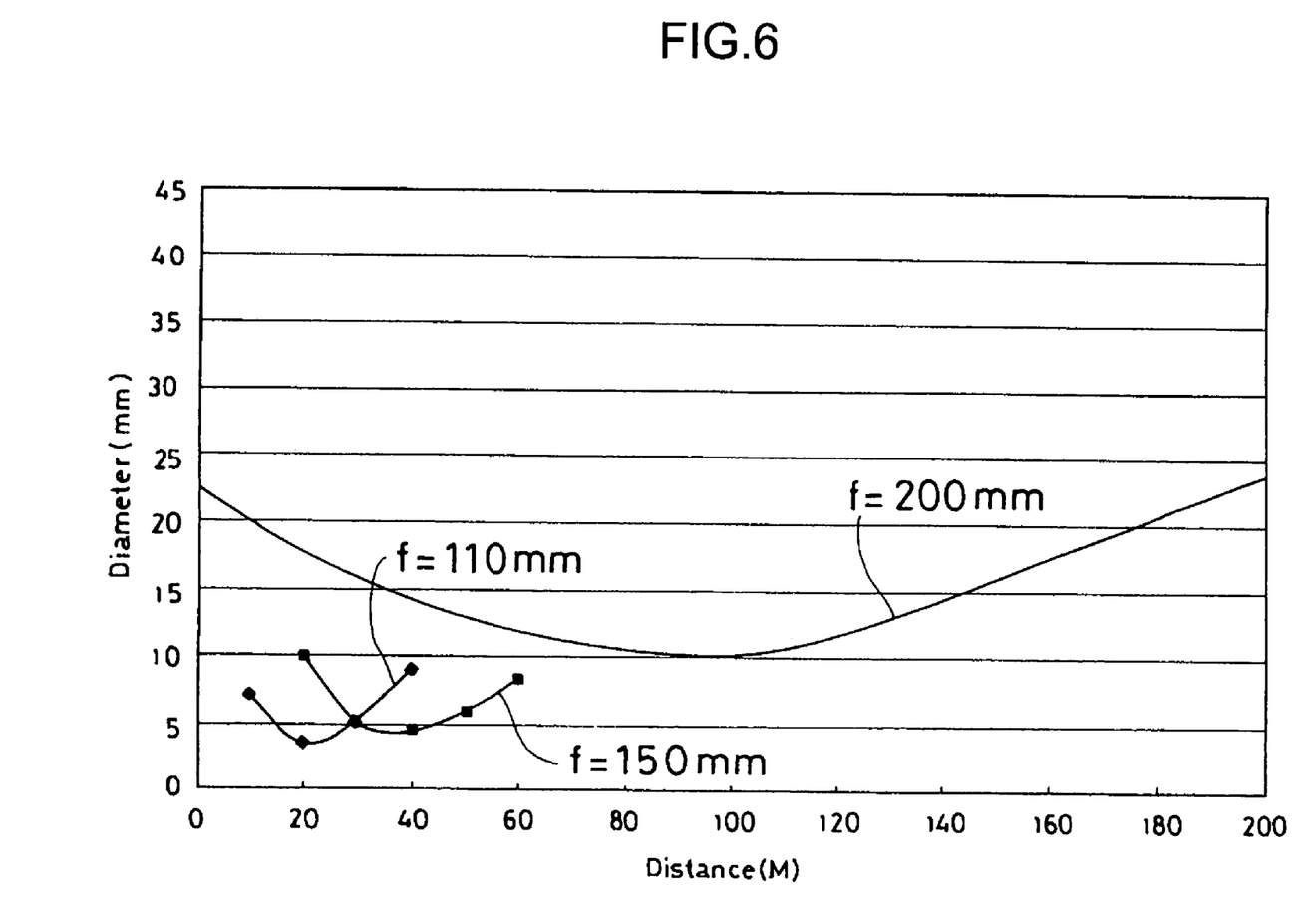
FIG. 6 is a diagram to represent relationship between focal distance and a beam diameter and a beam waist.

FIG. 6 shows relationship between the focal distance of the projection optical system 7 and a position where the beam waist is formed (a position where the beam diameter is set to the minimum). The cases where the focal distance f is f=200 mm, f=150 mm, and f=110 mm respectively are shown. The projected beam diameter $\phi$ in these cases are: $\phi$=3.0 mm when the focal distance f=200 mm; $\phi$=2.5 mm when f=150 mm; and $\phi$=2.0 mm when f=110 mm.

When the focal distance is increased, a distance between the position of the beam waist and the laser scanner 1 is increased. If the focal distance is decreased, the distance between the position of the beam waist and the laser scanner 1 is reduced. The beam diameter is increased as the distance from the position of the beam waist increases. The condition of this change is approximately similar to a parabola. The rate of the change is reduced when the focal distance is longer and the rate of the change is increased as the focal distance is decreased.

The luminous flux changing means 37 adjusts the focal distance of the projection optical system 7 so that the position of the beam waist of the distance measuring light 40 projected from the scanning unit 5 concurs or approximately concurs with the object to be measured or the position of the beam waist is at a position closer to the object to be measured.

A plurality of representative focal distances of the projection optical system 7, the positions of the beam waist and a beam diameter changing curve at each of the representative focal distances are acquired in advance and stored in an external storage unit 59 (to be described later) or in a storage unit 62.

Figure 3:
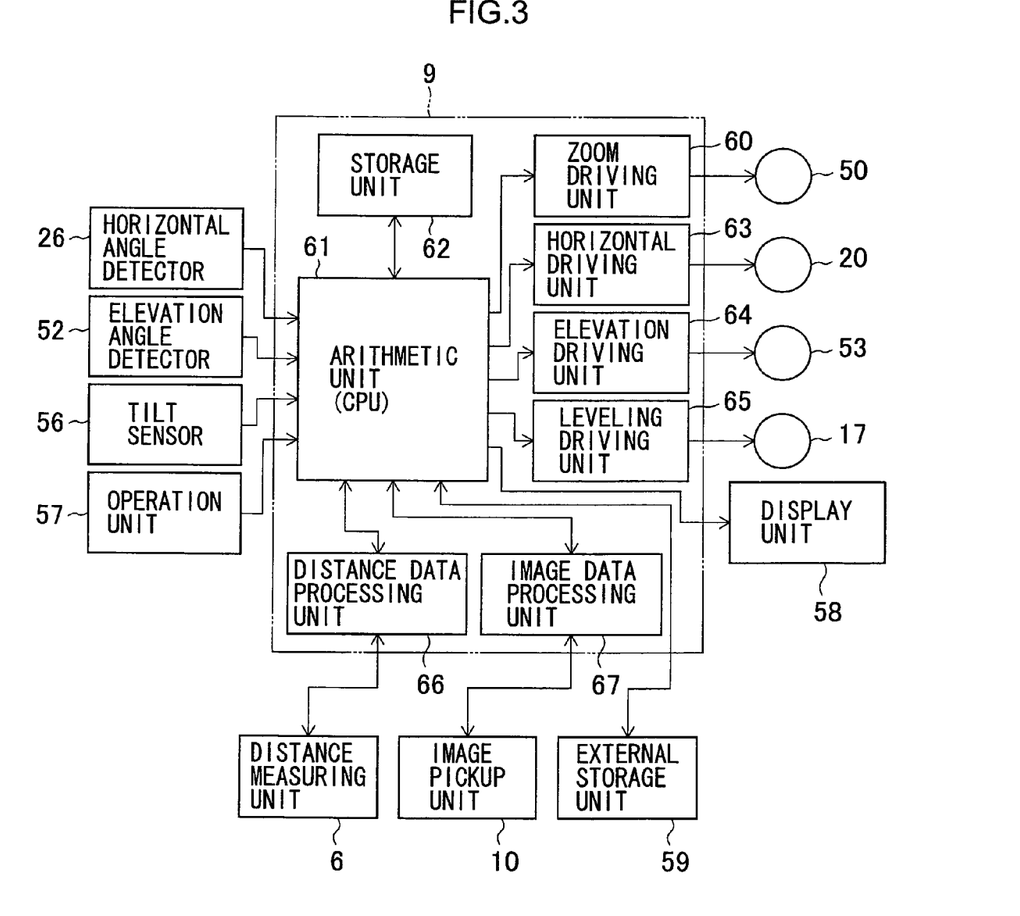
FIG. 3 is a block diagram to show an arrangement of the laser system.

Referring to FIG. 3, description will be given below on an arrangement of a control system of the laser scanner 1.

Detection signals from the horizontal angle detector 26, the elevation angle detector 52, and the tilt sensor 56 are inputted to the control unit 9, and the conditions necessary for starting the measurement of the laser scanner 1 and an instruction to start the measurement and the like can be also inputted to the control unit 9 from an operation unit 57 by an operator. The operation unit 57 may be installed in a casing such as the main unit casing 27, etc., or may be independently provided and may be operated by remote control operation via a signal transmitting medium such as wireless means, infrared light, etc.

The control unit 9 drives the horizontal rotating motor 20, the elevation rotating motor 53, the leveling motor 17, and the zooming mechanism 50, and the control unit 9 also drives a display unit 58, which displays operating conditions, measurement results, etc. In the control unit 9, there are provided the external storage unit 59 such as a memory card, a HDD, etc., or the external storage unit 59 removably arranged on the control unit 9.

Now, description will be given on general features of the control unit 9.

The control unit 9 comprises an arithmetic unit 61 typically represented by a CPU, and the storage unit 62 where there are stored programs and data such as measurement data and image data, etc. These programs include a sequence program and a computation program which are necessary for measuring a distance and detecting an elevation angle and a horizontal angle, a measurement data processing program for executing the processing of measurement data, an image processing program for image processing, an image display program for displaying the data on the display unit 58, and a program for integrally managing these programs. The control unit 9 further comprises a zoom driving unit 60 for driving and controlling the zooming mechanism 50, a horizontal driving unit 63 for driving and controlling the horizontal rotating motor 20, an elevation driving unit 64 for driving and controlling the elevation rotating motor 53, a leveling driving unit 65 for driving and controlling the leveling motor 17, a distance data processing unit 66 for processing distance data obtained by the distance measuring unit 6, an image data processing unit 67 for processing image data obtained by the image pickup unit 10, and so on.

The functions of the distance data processing unit 66 and the image data processing unit 67 may be executed by the arithmetic unit 61. In this case, the distance data processing unit 66 and the image data processing unit 67 may not be used. By providing the distance data processing unit 66 and the image data processing unit 67 independently, the distance data processing and the image data processing can be executed in parallel, and this makes it possible to perform the processing at high speed.

The distance data processing unit 66 and the image data processing unit 67 may be arranged separately. For instance, it may be so designed that a personal computer (PC) is provided separately and the functions of the distance data processing unit 66 and the image data processing unit 67 may be carried out by the PC. In this case, it may be so arranged that distance data and image data are stored in the external storage unit 59, and after storing the data, the external storage unit 59 may be removed from the control unit 9 and is connected to the PC, and the distance data processing and the image data processing may be carried out by the PC. Also, the data acquired by the laser scanner 1 may be sent to the PC by communication means as required such as wireless LAN, or the like. In this case, there is no need to design the external storage unit 59 as removable or the external storage unit 59 may not be used.

Next, description will be given on the measuring operation by the laser scanner 1 and on the acquisition of measurement data.

The laser scanner is installed at a known point. Leveling is specified from the operation unit 57, and the leveling is carried out.

The leveling motor 17 is driven via the leveling driving unit 65. Tilting of the laser scanner 1 is detected by the tilt sensor 56, and the result of detection by the tilt sensor 56 is fed back to the control unit 9. The adjusting screws 14 are rotated by the leveling motor 17 so that the tilt sensor 56 detects horizontal position.

When the leveling operation is completed, the completion of leveling is displayed on the display unit 58, or the completion of leveling is announced by means such as alarm sound, etc.

When the leveling operation is completed, the laser scanner 1 is directed in a measuring direction. The measuring direction is collimated by the sight 47. Further, a measurement area is set up.

When the setting of the measurement area is completed, preliminary measurement is carried out first on a portion within the measurement area.

The luminous flux diameter changing means 37 is driven, and setting is performed so that the focal distance of the projection optical system 7 is set to an initial value, e.g. the focal distance is set to f=200 mm. Further, the posture of the elevation rotary mirror 39 is set up so that the reflection surface of the elevation rotary mirror 39 is positioned face-to-face to the light emitting element 36.

A distance measuring light is emitted as a pulsed light from the light emitting element 36. The distance measuring light passes through the luminous flux diameter changing means 37 and the aperture of the aperture mirror 31, and is turned to parallel luminous fluxes by the objective lens 38. Further, the distance measuring light is deflected by the elevation rotary mirror 39 and is projected on the projection light optical axis 41. Under the condition that the distance measuring light is emitted as a pulsed light, the horizontal rotary mirror 20 and the elevation rotating motor 53 are driven in synchronization. The measuring system main unit 4 is rotated in a horizontal direction and the elevation rotary mirror 39 is rotated in an elevation direction. For instance, each time the distance measuring light 40 is projected in a horizontal direction for scanning, the elevation rotary mirror 39 is rotated at an angle pitch as required. As the feeding is applied in an elevation direction of the distance measuring light 40, total region of the measurement area is scanned (laser scanning) by the distance measuring light 40 emitted with pulse (hereinafter referred as "pulsed distance measuring light 40"). The distance data measured for each pulse is acquired, and a preliminary measurement data is stored in the external storage unit 59 or in the storage unit 62.

In case the preliminary measurement is carried out, it may be so designed that light emission interval of the pulsed distance measuring light 40 is made longer and that the feeding amount in an elevation direction may be increased.

After being reflected by the object to be measured, the reflected distance measuring light enters the elevation rotary mirror 39, and the reflected distance measuring light is deflected to the optical axis 30 by the elevation rotary mirror 39. Then, the reflected distance measuring light is reflected by the aperture mirror 31 and the reflection mirror 33, and the reflected distance measuring light is converged by the condenser lens 34 and is received by the photodetection element 35. At the distance measuring unit 6, the distance measurement is performed for each pulse based on the reflected distance measuring light.

By the preliminary measurement, a distance to the object to be measured in the measurement area is measured. The focal distance in the preliminary measurement is the value of the initial setting, i.e. f=200 mm. The beam diameter of the pulsed distance measuring light 40 emitted in this case is 3.0 mm, and the beam diameter of the beam waist is 10 mm. However, when the distance to the object to be measured is 20 m, for instance, the beam diameter at the projected point is increased to 18 mm.

Next, main measurement is performed to improve the measurement accuracy based on the results of the preliminary measurement.

As the preparation for the main measurement, the beam diameter is changed based on the results of distance measurement in the preliminary measurement, i.e. the focal distance of the projection optical system 7 is changed by the luminous flux diameter changing means 37.

Based on the results of distance measurement in the preliminary measurement, the arithmetic unit 61 selects the focal distance, which has the beam waist with the value closest to the results of distance measurement, based on the relationship between the focal distance and the beam waist stored in the external storage unit 59 or the storage unit 62. For instance, the focal distance (f=110 mm) is selected according to FIG. 6, and the luminous flux diameter changing means 37 is driven so that the focal distance will be 110 mm.

When the focal distance is changed to 110 mm, the beam diameter at the point where the distance to the object to be measured is 20 m is about 3 mm, and the beam diameter is extensively decreased. Therefore, the influence from the condition of the projected surface of the object to be measured is decreased, and this contributes to the improvement of the measurement accuracy and the reliability.

When the change of the focal distance, i.e. and the change of the projection beam diameter of the pulsed distance measuring light 40 is completed, the main measurement is performed in a manner similar to the preliminary measurement. However, in case of the main measurement, the light emitting interval of the pulsed distance measuring light 40 is decreased. Also, the feeding amount in an elevation direction is reduced and the measurement is made at a multiple of points. By performing the measurement at a multiple of points, the reliability and the accuracy of the measurement are increased.

The distance data measured for each pulse is acquired. A detected horizontal angle by the horizontal angle detector 26 and a detected elevation angle by the elevation angle detector 52 when the pulsed light is emitted are acquired at the same time. Each measurement data is associated with the elevation angle data and the horizontal angle data and is stored in the storage unit 62.

In this case, the number of the acquired distance data is in the range of several millions to several tens of million although it depends on the extent of the measurement area. By associating the distance data thus acquired with the elevation angle data and the horizontal angle data, three-dimensional point data at each measuring point is obtained and 3-dimensional point group data in the total measurement area is acquired.

By acquiring the image of the measurement area by the image receiving unit (not shown) and by performing the matching of the image data with the point group data, it is possible to acquire image data with three-dimensional data.

In the embodiment as described above, the focal distance is selected automatically based on the distance measurement results of the preliminary measurement. However, the operator may adjust the focal distance manually or by operating the operation unit 57. Also, if the distance to the object to be measured is approximately known in advance, the preliminary measurement may be left out, and the focal distance may be set, and the main measurement may be carried out immediately.

Further, in case the laser surveying system is provided with a telescope or the like for collimation and focusing is made by using the telescope at the time of collimation, the distance to the object to be measured can be obtained based on the focusing position when the telescope is focused, and the focal distance may be set up according to this distance.

Figure 5:
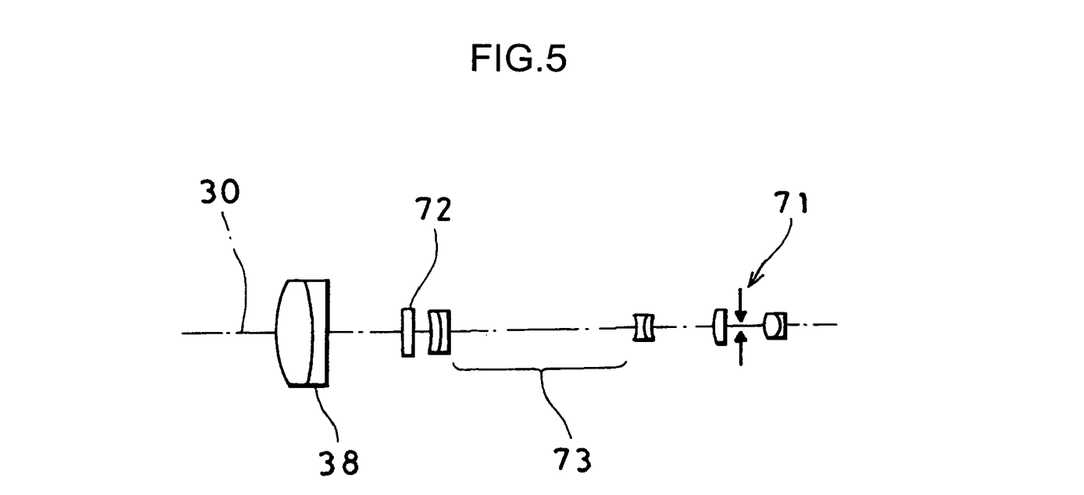
FIG. 5 is a schematical drawing to show another example of the luminous flux diameter changing means in the present invention.

FIG. 5 shows another example of the luminous flux diameter changing means 37. A variable diaphragm mechanism 71 to change an aperture diameter is provided as the luminous flux diameter changing means 37. By the variable diaphragm mechanism 71, the projection beam diameter can be changed, and a beam diameter corresponding to the distance can be selected. Further, as the luminous flux diameter changing means 37, transparent glasses 72 with different thicknesses may be brought in turn in or out of the optical axis 30 and the optical path length can be changed, and the focal distance can be changed substantially. As the luminous flux diameter changing means 37, at least one of the zooming mechanism 50, the variable diaphragm mechanism 71, and the removable transparent glass 72 may be used. In the figure, reference numeral 73 denotes a relay lens.

What is claimed is:

1. A laser surveying system, comprising a light source for emitting a laser beam, a projection optical system for turning the laser beam from said light source to a parallel luminous flux, a scanning unit for projecting the luminous flux of the projected laser beam for scanning, a scanning direction detecting unit for detecting a scanning direction, a photodetection optical system for receiving a reflected light of the projected laser beam from an object to be measured, a photodetection element for performing photo-electric conversion of the reflected light received via said photodetection optical system, a distance measuring unit for measuring a distance based on a signal from said photodetection element, wherein said projection optical system has a luminous flux diameter changing means, and a luminous flux diameter of the projected laser beam is enabled to be changed, and a control unit for selecting a beam diameter based on an approximate distance to the object to be measured and for controlling said luminous flux diameter changing means so as to create a laser beam having said selected beam diameter.

2. A laser surveying system according to claim 1, wherein said luminous flux diameter changing means changes an aperture diameter of said projection optical system.

3. A laser surveying system according to claim 1, wherein said luminous flux diameter changing means changes a focal distance of said projection optical system.

4. A laser surveying system according to claim 1, wherein said control unit controls said luminous flux diameter changing means according to an approximate distance obtained through a preliminary measurement on a distance to the object to be measured by the laser beam with an arbitrary luminous flux diameter.

5. A laser surveying system according to claim 1, wherein said control unit controls said luminous flux diameter changing means so that the position of the beam waist concurs or approximately concurs with the object to be measured or the position of the beam waist is at a position closer to the object to be measured.

6. A laser surveying system according to claim 1, wherein said control unit has data about a plurality of focal distances of said projection optical system, the positions of the beam waist and a beam diameter changing curve at each of the representative focal distances, and wherein said control unit performs a preliminary measurement of said approximate distance to the object to be measured by the laser beam with the arbitrary luminous flux diameter and controls said luminous flux diameter changing means based on said determined approximate distance and on said data.

7. A laser surveying system according to claim 1, further comprising a collimating telescope having a focusing mechanism, wherein said approximate distance to the object to be measured is determined from a focusing position of said collimating telescope and said luminous flux diameter changing means is controlled according to said approximate distance.

8. A distance measuring method, comprising a step of performing a preliminary measurement of an approximate distance to the object to be measured, a step of using a control unit to select a beam diameter of a laser beam suitable for said approximate distance to an object to be measured, a step of projecting a laser beam having the selected beam diameter to the object to be measured, a step of receiving a reflected light of the projected laser beam from the object to be measured, and a step of measuring a distance to the object to be measured based on the received reflection light.

9. A distance measuring method according to claim 8, wherein said step of performing a preliminary measurement of the approximate distance to the object to be measured is performed by projecting the laser beam for scanning, wherein said control unit selects the beam diameter according to the approximate distance obtained.

10. A distance measuring method according to claim 8, further comprising a step of collimating the object to be measured and focusing by a focusing mechanism, and wherein said step of performing a preliminary measurement to measure the approximate distance to the object to be measured is based on a focusing position of said focusing mechanism, wherein said control unit selects the beam diameter according to the approximate distance obtained.

* * * * *